(12) United States Patent
Nam et al.

(10) Patent No.: US 8,817,987 B2
(45) Date of Patent: Aug. 26, 2014

(54) ENCRYPTION COMMUNICATION APPARATUS AND METHOD FOR CONTROLLING TRANSFER PERIOD OF KEY RESYNCHRONIZATION INFORMATION

(75) Inventors: Taek Jun Nam, Daejeon (KR); Taek Kyu Lee, Daejeon (KR); Sang Yi Yi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1743 days.

(21) Appl. No.: 12/211,993

(22) Filed: Sep. 17, 2008

(65) Prior Publication Data

US 2009/0161878 A1 Jun. 25, 2009

(30) Foreign Application Priority Data

Dec. 20, 2007 (KR) .................. 10-2007-0134464
Apr. 30, 2008 (KR) .................. 10-2008-0040447

(51) Int. Cl.
*H04L 29/06* (2006.01)
*H04L 12/56* (2006.01)

(52) U.S. Cl.
CPC .......... *H04L 63/0428* (2013.01); *H04L 47/365* (2013.01); *H04L 47/283* (2013.01); *H04L 63/068* (2013.01)
USPC ........... 380/260; 380/259; 380/283; 709/224; 370/229; 370/252; 370/350; 370/503; 370/509

(58) Field of Classification Search
USPC .......................... 380/259, 260, 283; 709/224; 370/229–235, 252, 350, 503–509
See application file for complete search history.

(56) References Cited

U.S. PATENT DOCUMENTS

| | | | |
|---|---|---|---|
| 7,127,508 B2 * | 10/2006 | Edmison et al. ............... 709/224 |
| 7,359,328 B1 * | 4/2008 | Allan ........................ 370/236.2 |
| 2002/0009072 A1 | 1/2002 | Halme | |

(Continued)

FOREIGN PATENT DOCUMENTS

| | | |
|---|---|---|
| KR | 1020010055405 A | 7/2001 |
| KR | 1020020021429 A | 3/2002 |
| KR | 2006-0010352 A | 2/2006 |
| WO | 01/56249 A1 | 8/2001 |

OTHER PUBLICATIONS

Qi Qu, et al: "Network-Aware Source-Adaptive Video Coding for Wireless Applications", MILCOM 2004-2004 IEEE Military Communications Conference, pp. 848-854.

Christopher M White, et al; "Packet Loss Concealment in a Secure Voice Over IP Environment", Conference Record of the Thirty-Eighth Asilomar Conference on Signals, Systems and Computers, vol. 1, 7 Nov. 7, 2004, pp. 415-419, XP010780381.

(Continued)

*Primary Examiner* — Carl Colin
*Assistant Examiner* — Ali Shayanfar
(74) *Attorney, Agent, or Firm* — Ladas & Parry LLP (57) ABSTRACT

An apparatus and method for controlling a packet transfer period of key resynchronization information in an encryption communication system are provided. The encryption communication apparatus includes a receiving means that computes a packet loss ratio and a network transfer delay time through a received packet when the packet is received and generates network status report information for a packet size and a packet transfer period of key resynchronization information using the packet loss ratio and the network transfer delay time, and a transmitting means that transmits a packet of the key resynchronization information in the transfer period by controlling the packet size and the packet transfer period of the key resynchronization information according to the network status report information received from the receiving means when data is input.

3 Claims, 4 Drawing Sheets

(56) References Cited

U.S. PATENT DOCUMENTS

| | | | |
|---|---|---|---|
| 2002/0066013 A1* | 5/2002 | Relander et al. | 713/151 |
| 2008/0031146 A1* | 2/2008 | Kwak et al. | 370/250 |
| 2008/0049769 A1* | 2/2008 | Bugenhagen | 370/401 |
| 2008/0144724 A1* | 6/2008 | Luo et al. | 375/240.26 |

OTHER PUBLICATIONS

European Search Report: dated Nov. 5, 2009; Application No./Patent No. 08164394.2-2413.

* cited by examiner

| Transfer delay time / Packet loss ratio | Constant | Increment | Decrement |
|---|---|---|---|
| Constant | Invariable | S-- | S++ |
| Increment | I-- | S--<br>I-- | S++<br>I-- |
| Decrement | I++ | S--<br>I++ | S++<br>I++ |

S : Packet size    I : Transfer period
++ : One-step increment, -- : One-step decrement

FIG. 5

ENCRYPTION COMMUNICATION APPARATUS AND METHOD FOR CONTROLLING TRANSFER PERIOD OF KEY RESYNCHRONIZATION INFORMATION

CROSS-REFERENCE TO RELATED APPLICATION

This application claims priority to and the benefit of Korean Patent Application No. 2007-134464, filed on Dec. 20, 2007 and 2008-40447, filed on Apr. 30, 2008, the disclosure of which is incorporated herein by reference in its entirety.

BACKGROUND

1. Field of the Invention

The present invention relates to an apparatus and method for controlling a transfer period of key resynchronization information in an encryption communication system.

2. Discussion of Related Art

In an encryption communication system, one communication party encrypts information and another communication party correctly acquires the original information by receiving and decrypting the encrypted information.

In such a communication system, when a receiving side provides a transmitting side with location information of the receiving side and status information regarding a network between the receiving side and the transmitting side, the transmitting side controls and reports an amount of transmission data to the receiving side.

By reducing the number of packets capable of being lost in the network while the transmitting side transmits packets to the receiving side, better communication quality may be provided to the receiving side.

However, when the packets are transmitted in the above method, key resynchronization information may be dropped. When key resynchronization is not acquired even when the receiving side receives the packets, the packets should be dropped. There is a problem in that communication quality may be unsatisfactory to a user.

SUMMARY OF THE INVENTION

The present invention provides an encryption communication apparatus and method that can control a transfer period of key resynchronization information using network status report information in a communication system.

According to an aspect of the present invention, there is provided an encryption communication apparatus including: a receiving means that computes a packet loss ratio and a network transfer delay time through a received packet when the packet is received and generates network status report information for a packet size and a packet transfer period of key resynchronization information using the packet loss ratio and the network transfer delay time; and a transmitting means that transmits a packet of the key resynchronization information in the transfer period by controlling the packet size and the packet transfer period of the key resynchronization information according to the network status report information received from the receiving means when data is input.

According to another aspect of the present invention, there is provided a method for controlling a transfer period of key resynchronization information in an encryption communication apparatus, including: extracting a packet number and a packet transmission time of a received packet when the packet is received; computing values of a packet loss ratio and a network transfer delay time using the extracted packet number and the extracted packet transmission time; and generating and transmitting network status report information for changing a packet size and a packet transfer period of key resynchronization information using the computed values.

According to still another aspect of the present invention, there is provided a method for controlling a transfer period of key resynchronization information in an encryption communication apparatus, including: determining whether network status report information for changing a packet transfer period of key resynchronization information has been received when data is input; changing a packet size and the packet transfer period of the key resynchronization information according to the received network status report information when the network status report information has been received; and generating and transmitting a packet of the key resynchronization information when a point of time of transmitting the packet of the key resynchronization information is detected according to the changed transfer period.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail with reference to the accompanying drawings. In the drawings, the same or similar elements are denoted by the same reference numerals even though they are depicted in different drawings. Descriptions of well-known functions and constructions are omitted for clarity and conciseness.

An encryption communication apparatus for controlling a transfer period of key resynchronization information in an encryption communication system according to an exemplary embodiment of the present invention will be described with reference to FIG. 1.

In a description of the encryption communication apparatus in the encryption communication system, a transmitting means of an encryption communication apparatus at a transmitting side and a receiving means of an encryption communication apparatus at a receiving side will be separately described. Of course, both the transmitting means and the receiving means can be configured in one encryption communication apparatus.

Figure 1:
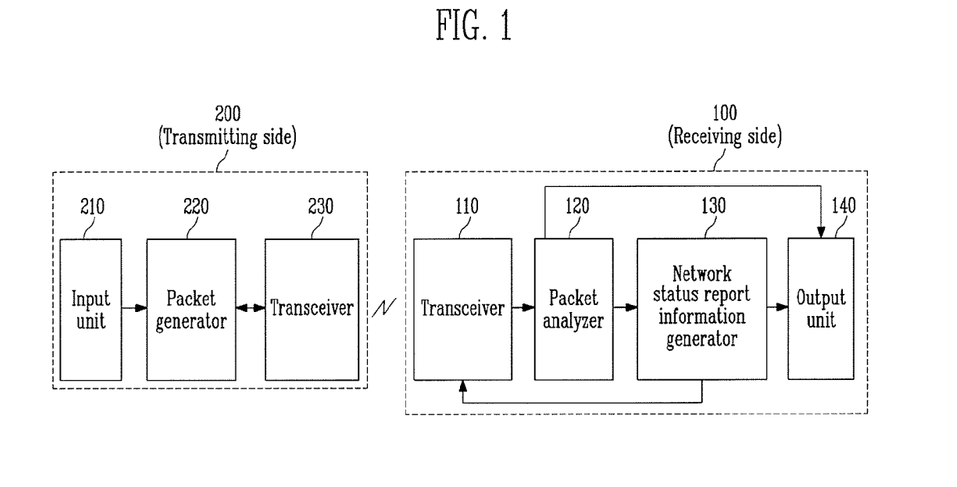
FIG. 1 is a block diagram showing an internal structure of an encryption communication apparatus according to an exemplary embodiment of the present invention.

FIG. 1 is a block diagram showing an internal structure of an encryption communication apparatus according to an exemplary embodiment of the present invention.

The encryption communication environment includes a transmitting means 200 of the encryption communication apparatus at the transmitting side for encrypting and transmitting information and a receiving means 100 for correctly extracting the original information by decrypting the encrypted information received from the transmitting means 200.

According to an exemplary embodiment of the present invention, the receiving means 100 includes a transceiver 110, a packet analyzer 120, a network status report information generator 130, and an output unit 140.

The transceiver 110 receives packets from the transmitting means 200 and transmits network status report information generated by the network status report information generator 130 to the transmitting means 200.

When a packet transmitted by the transmitting means 200 is input from the transceiver 110, the packet analyzer 120 computes a packet loss ratio and a network transfer delay time by extracting a packet sequence number and a packet transmission time from the packet.

At this time, the packet analyzer 120 computes average values by computing the packet loss ratio and the transfer delay time for every received packet using the packet sequence number and the packet transmission time extracted from the received packet and a received present time.

Since a process for extracting the packet sequence number and the packet transmission time through the received packet and computing the packet loss ratio and the transfer delay time is the same as a conventional process for computing the packet loss ratio and the network transfer delay time through the received packet, its description is omitted.

When the packet analyzer 120 computes the packet loss ratio and the network transfer delay time, the network status report information generator 130 determines a network status using the computed values and generates network status report information according to the network status.

Figure 2:
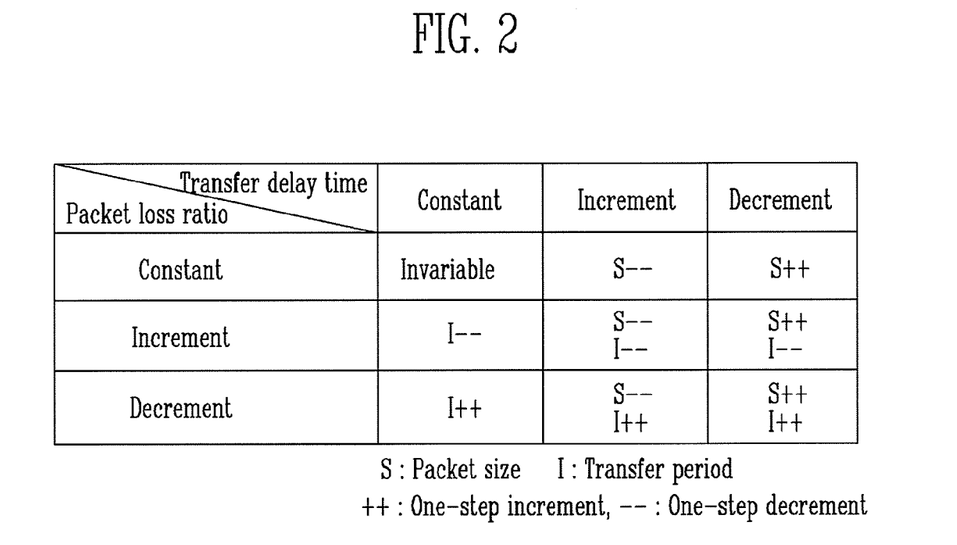
FIG. 2 is a table for explaining a process for generating network status report information according to an exemplary embodiment of the present invention.

At this time, the network status report information generator 130 can determine the network status by applying the computed packet loss ratio and the computed network transfer delay time to a table shown in FIG. 2.

FIG. 2 shows the table for explaining a process for controlling a packet size and a packet transfer period of key resynchronization information according to the network status. In the detailed description of the present invention, it is defined that the network status is determined with reference to FIG. 2.

The output unit 140 performs a function for outputting data of packets received through the transceiver 110 to a speaker, a screen, or the like.

According to an exemplary embodiment of the present invention, the transmitting means 200 includes an input unit 210, a packet generator 220, and a transceiver 230.

The input unit 210 performs a function for receiving multimedia data input from a microphone or camera and receiving data from an external device connected thereto.

When data is input from the input unit 210, the packet generator 220 configures a packet by encoding the input data.

The packet generator 220 determines whether network status report information has been received from the counterpart receiving means 100. When the network status report information has been received, the packet generator 220 performs a function for determining a packet period and a packet generation period of key resynchronization information on the basis of the network status report information.

The transceiver 230 performs a function for transmitting the packet configured with the input data and a function for transmitting a packet of the key resynchronization information determined according to the network status report information received from the counterpart receiving means 100.

FIG. 2 is a table for explaining a process for generating network status report information according to an exemplary embodiment of the present invention.

Referring to FIG. 2, the network status report information according to the exemplary embodiment of the present invention is configured with reference to the packet loss ratio and the network transfer delay time of the received packet.

The network status report information can be generated by classifying a case where the packet loss ratio is constant, incremented, or decremented when the transfer delay time has been constant, a case where the packet loss ratio is constant, incremented, or decremented when the transfer delay time has been decremented, and a case where the packet loss ratio is constant, incremented, or decremented when the transfer delay time has been incremented.

In this regard, the network status report information generator 130 determines that the loss due to an error has occurred since packet loss has been larger in comparison with a spare bandwidth when the transfer delay time of the received packet has been decremented and the packet loss ratio has been incremented.

The network status report information generator 130 generates network status report information to increment a data packet size (S++) and shorten a transmission interval of key resynchronization information (I--).

When the transfer delay time of the received packet has been decremented and the packet loss ratio corresponding thereto has been decremented, the network status report information generator 130 generates network status report information for incrementing the data packet size (S++) and lengthening the transmission interval of key resynchronization information (I++) such that a packet transmission amount is incremented to more than a present amount since the spare bandwidth is present and the packet loss is small.

When the transfer delay time of the received packet has been incremented and the packet loss ratio corresponding thereto has been incremented, the network status report information generator 130 determines that the packet loss has occurred due to an unexpected error and a narrow bandwidth and generates network status report information to decrement the data packet size (S--) and shorten the packet transmission interval of key resynchronization information (I--) as a countermeasure for preventing the loss of key resynchronization information to be transmitted.

When the transfer delay time of the received packet has been incremented and the packet loss ratio corresponding thereto has been decremented, the network status report information generator 130 generates the network status report information to decrement the data packet size (S--) and lengthen the transfer period of key resynchronization information (I++) since a data transmission amount should be decremented by only determining that the bandwidth is narrow.

As described above, the network status report information generator 130 generates network status report information such that the packet size and the packet transfer period of key resynchronization information can be controlled in the transmitting means 200 using the method as described with reference to FIG. 2.

In the present invention as described above, an example in which network status report information is generated through 9 steps with respect to the packet loss ratio and the transfer delay time has been described, but any method capable of generating a control signal to control a packet size and a packet transfer period of key resynchronization information using the packet loss ratio and the transfer delay time can be used.

A process for determining a network status using a packet loss ratio and a transfer delay time and generating network status report information to control a transfer period of corresponding key resynchronization information will be described with reference to FIG. 3.

Figure 3:
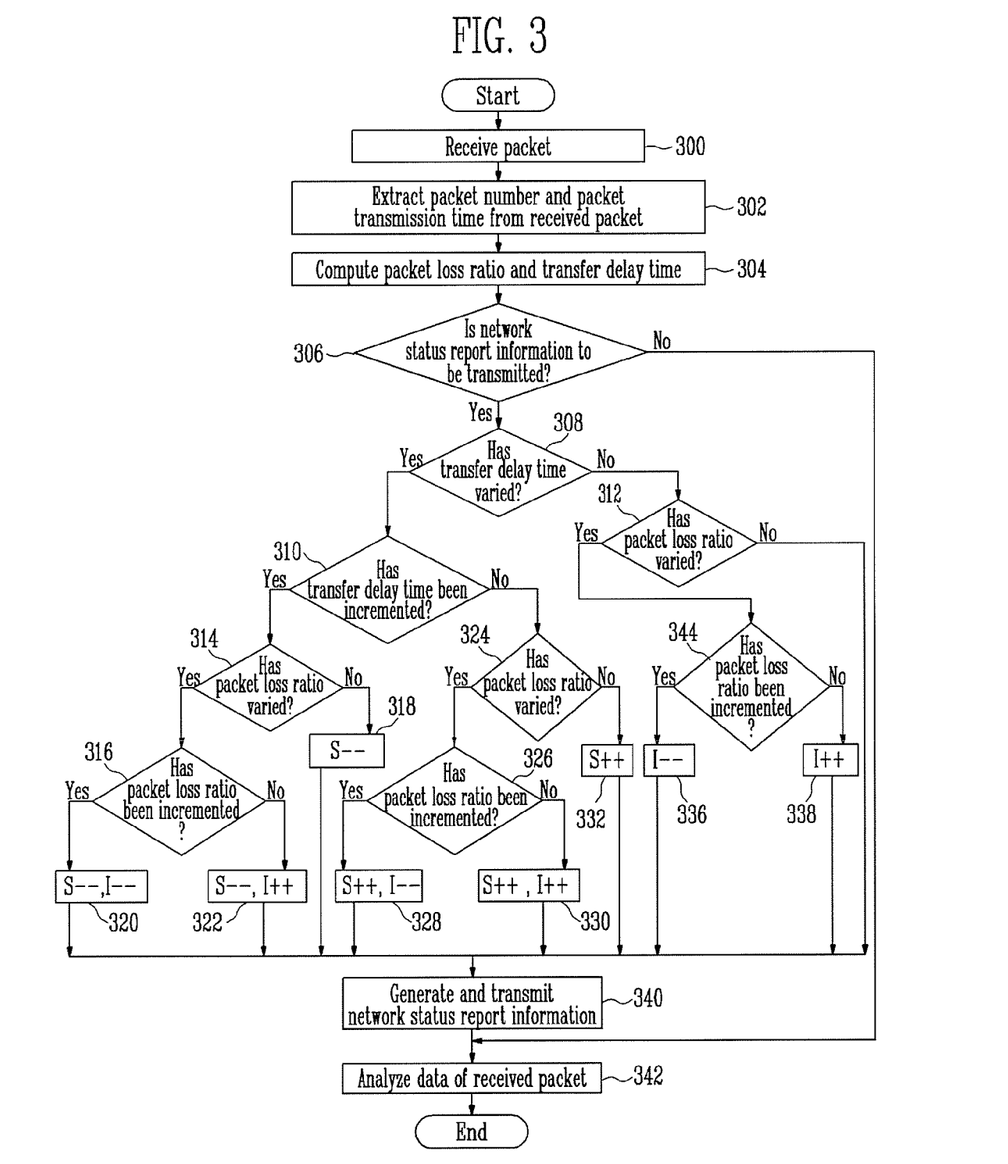
FIG. 3 is a flowchart showing a control flow of a receiving means in the encryption communication apparatus according to an exemplary embodiment of the present invention.

FIG. 3 is a flowchart showing a control flow of the receiving means in the encryption communication apparatus according to an exemplary embodiment of the present invention.

Referring to FIG. 3, when a packet is received from the transmitting means 200, the transceiver 110 detects it and transfers the received packet to the packet analyzer 120 in step 300.

In step 302, the packet analyzer 120 extracts a packet number and a packet transmission time from the packet of step 300 received through the transceiver 110.

When the packet number and the packet transmission time of the received packet are extracted in step 302, the packet analyzer 120 computes the packet loss ratio and the packet transfer delay time using the packet number and the packet transmission time extracted in step 304.

The packet analyzer 120 goes to step 306 to determine whether to transmit the network status report information at the present time.

Upon determining that the present network status report information does not need to be transmitted to the transmitting means 200 in step 306, the packet analyzer 120 goes to step 342.

In step 342, the packet analyzer 120 analyzes data of the received packet and outputs the data through the output unit 140.

Upon determining that the network status report information is to be transmitted to the transmitting means 200 in step 306, the packet analyzer 120 transmits the packet loss ratio and the packet transfer delay time computed in step 304 to the network status report information generator 130.

In step 308, the network status report information generator 130 determines whether the network transfer delay time has varied through the packet loss ratio and the packet transfer delay time received from the packet analyzer 120.

Upon determining that the network transfer delay time has varied in step 308, the network status report information generator 130 goes to step 310.

Upon determining that the transfer delay time has been incremented in step 310, the network status report information generator 130 goes to step 314 to determine whether the packet loss ratio has varied in correspondence with the incremented transfer delay time.

Upon determining that the packet loss ratio has not varied in correspondence with the incremented transfer delay time in step 314, the network status report information generator 130 goes to step 318 to determine the network status. In step 340, the network status report information generator 130 generates the network status report information to decrement the packet size (S−−).

Upon determining that the packet loss ratio has varied in correspondence with the incremented transfer delay time in step 314, the network status report information generator 130 determines whether the packet loss ratio has been incremented in step 316 and goes to step 320.

In step 320, the network status is determined. In step 340, the network status report information is generated to decrement the data packet size and shorten the packet transfer period of key resynchronization information (S−−, I−−).

Upon determining that the packet loss ratio has been decremented in step 316, the network status report information generator 130 goes to step 322 to determine the network status. In step 340, the network status report information generator 130 generates the network status report information to decrement the data packet size and lengthen the packet transfer period of key resynchronization information (S−−, I++).

On the other hand, upon determining that the transfer delay time has been decremented in step 310, the network status report information generator 130 goes to step 324 to determine whether the packet loss ratio has varied.

Upon determining that the packet loss ratio has varied in step 324, the network status report information generator 130 determines whether the packet loss ratio has been incremented in step 326.

Upon determining that the packet loss ratio has been incremented in step 326, the network status report information generator 130 goes to step 328 to determine the network status. In step 340, the network status report information generator 130 generates the network status report information to increment the data packet size and shorten the packet transfer period of key resynchronization information (S++, I−−).

Upon determining that the packet loss ratio has been decremented in step 326, the network status report information generator 130 goes to step 330 to determine the network status. In step 340, the network status report information generator 130 generates the network status report information to increment the data packet size and lengthen the packet transfer period of key resynchronization information (S++, I++).

When no variation of the packet loss ratio has been detected in step 324, the network status report information generator 130 determines the network status in step 332. In step 340, the network status report information generator 130 generates the network status report information to lengthen the data packet size (S++).

On the other hand, upon determining that no variation of the transfer delay time has been made in step 308, the network status report information generator 130 goes to step 312 to determine whether the packet loss ratio has varied.

When a variation of the packet loss ratio has been detected in step 312, the network status report information generator 130 goes to step 334 to determine whether the packet loss ratio has been incremented. When the packet loss ratio has been incremented, the network status is determined in step 336.

In step 340, the network status report information generator 130 generates the network status report information to shorten the packet transfer period of key resynchronization information (I−−).

Upon determining that the packet loss ratio has been decremented in step 334, the network status report information generator 130 goes to step 338 to determine the network status.

In step 340, the network status report information is generated to lengthen the packet transfer period of key resynchronization information (I++).

Upon determining that the transfer delay time and the packet loss ratio have not varied in steps 312, the network status report information generator 130 goes to step 340 to generate the network status report information such that the data packet size and the packet transfer period of key resynchronization period do not vary.

When the network status report information has been generated as shown in the table of FIG. 2 in step 340, the network status report information generator 130 transmits the generated information to the transmitting means 200 through the transceiver 110.

Thereafter, in step 342, the packet analyzer 120 analyzes the data of the received packet and outputs the received data through the output unit 140.

A method in which the transmitting means of the encryption communication apparatus transmits a packet of key resynchronization information based on the network status report information received from the receiving means will be described with reference to FIG. 4.

Figure 4:
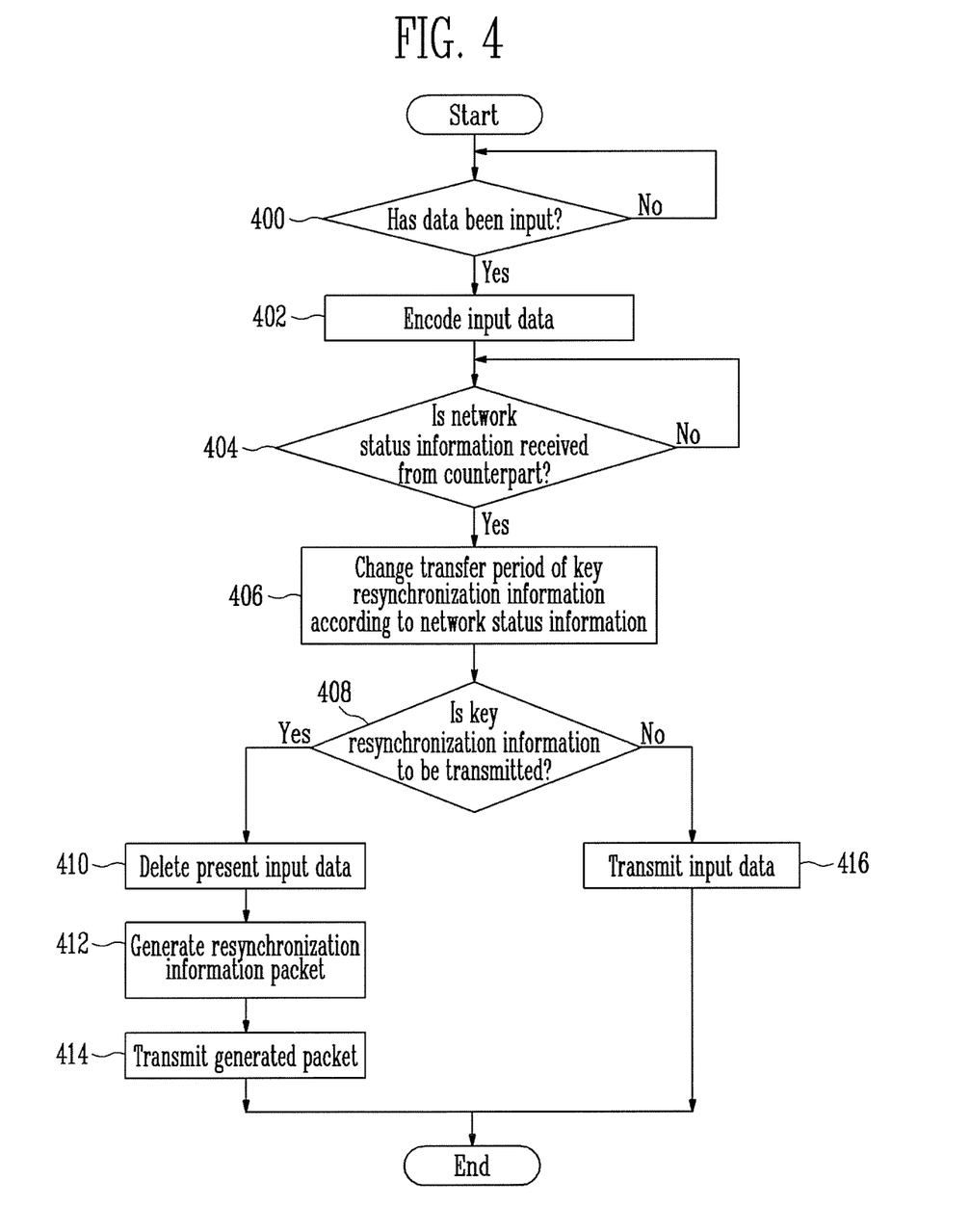
FIG. 4 is a flowchart showing a control flow of a transmitting means in the encryption communication apparatus according to an exemplary embodiment of the present invention.

FIG. 4 is a flowchart showing a control flow of the transmitting means in the encryption communication apparatus according to an exemplary embodiment of the present invention.

Referring to FIG. 4, when data is input through the input unit 210, the packet generator 220 determines whether the data is input in step 400 and encodes the input data in step 402.

The packet generator 220 goes to step 404 to determine whether network status report information has been received from the receiving means 100.

Upon determining that the network status report information has been received in step 404, the packet generator 220 goes to step 406 to change a packet size and a transfer period of key resynchronization information on the basis of the received network status report information.

Thereafter, the packet generator 220 goes to step 408 to determine whether to transmit the key resynchronization information at the present time.

Upon determining that the key resynchronization information is to be transmitted at the present time in step 408, the packet generator 220 goes to step 410 to delete the present input data.

A packet with the key resynchronization information is generated in step 412 and the generated packet with the key resynchronization information is transmitted in step 414.

Upon determining that the key resynchronization information is not to be transmitted at the present time in step 408, the packet generator 220 goes to step 416 to transmit only the encoded data.

Figure 5:
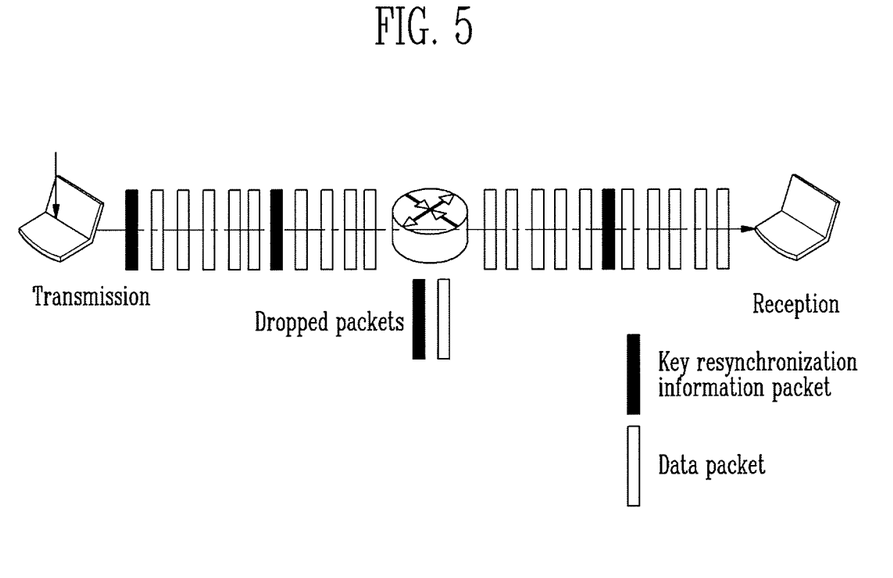
FIG. 5 shows a system including the encryption communication apparatus according to an exemplary embodiment of the present invention.

FIG. 5 shows a system including the encryption communication apparatus according to an exemplary embodiment of the present invention.

The present invention will be briefly described with reference to FIG. 5. When data is input into the transmitting means 200, the transmitting means 200 encodes the input data and transmits the encoded data to the receiving means 100.

At this time, the transmitting means 200 transmits one key resynchronization information packet per six packets.

According to the network status, the key resynchronization information packet may be dropped. In this case, all of five data packets transmitted between a key resynchronization information packet and a data packet may not be normally decoded since key information is absent.

Accordingly, a packet size and a packet transfer period of key resynchronization information adaptive to a network are controlled in advance using a packet transfer delay time and a packet loss ratio, thereby reducing the number of packets on which a decoding operation fails and minimizing the quality degradation of encryption communication.

The present invention can reduce the number of packets dropped when a decoding operation fails at a receiving side and improve communication quality by controlling a packet transfer period of key resynchronization information using network status report information of the receiving side in an encryption communication system.

Although exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. An encryption communication apparatus comprising:
a receiving means to compute a packet loss ratio and a network transfer delay time through a received packet when the packet is received and generate network status report information for a packet size and a packet transfer period of key resynchronization information using the packet loss ratio and the network transfer delay time, wherein the receiving means comprises:
a packet analyzer to compute the packet loss ratio and the network transfer delay time by extracting a packet sequence number and a packet transmission time from the received packet,
a network status report information generator to determine a network status using the computed packet loss ratio and the computed network transfer delay time and generate the network status report information for controlling the packet size and the packet transfer period of the key resynchronization information, and
a transceiver to receive the packet and transmits the generated network status report information; and
a transmitting means to transmit a packet of the key resynchronization information in the transfer period by controlling the packet size and the packet transfer period of the key resynchronization information according to the network status report information received from the receiving means when data is input, wherein the network status report information generator generates the network status report information and executes at least one of:
(i) decrement or increment the packet size according to an increment or decrement of the transfer delay time without changing the packet transfer period of the key resynchronization information when the packet loss ratio has been constant;
(ii) decrement or increment the packet size according to an increment or decrement of the transfer delay time by decrementing the packet transfer period of the key resynchronization information when the packet loss ratio has been incremented and
(iii) decrement or increment the packet size according to an increment or decrement of the transfer delay time by incrementing the packet transfer period of the key resynchronization information when the packet loss ratio has been decremented.

2. The encryption communication apparatus of claim 1, wherein the transmitting means comprises:
a packet generator that generates a packet of the input data and determines the packet size and the packet transfer period of the key resynchronization information using the received network status report information; and
a transceiver that receives the network status report information and transmits the packet of the key resynchronization information according to the transfer period determined by the packet generator.

3. A method for controlling a transfer period of key resynchronization information in an encryption communication apparatus, comprising:
- extracting a packet number and a packet transmission time of a received packet when the packet is received;
- computing values of a packet loss ratio and a network transfer delay time using the extracted packet number and the extracted packet transmission time; and
- generating and transmitting network status report information for changing a packet size and a packet transfer period of key resynchronization information using the computed values, wherein the generating of the network status report information comprises at least one of:
- (i) generating the network status report information to decrement or increment the packet transfer period of the key resynchronization information according to an increment or decrement of the packet loss ratio without changing the packet size when the transfer delay time has been constant,
- (ii) generating the network status report information to decrement or increment the packet transfer period of the key resynchronization information according to an increment or decrement of the packet loss ratio by decrementing the packet size when the transfer delay time has been incremented, and
- (iii) generating the network status report information to decrement or increment the packet transfer period of the key resynchronization information according to an increment or decrement of the packet loss ratio by incrementing the packet size when the transfer delay time has been decremented.

* * * * *